(12) United States Patent
Nakano et al.

(10) Patent No.: US 11,643,097 B2
(45) Date of Patent: May 9, 2023

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Yuki Nakano, Nisshin (JP); Masato Ura, Nisshin (JP); Koji Takao, Toyota (JP); Hideyuki Sakurai, Toyota (JP); Keisuke Hotta, Miyoshi (JP); Rieko Masutani, Toyota (JP); Atsushi Hanawa, Miyoshi (JP); Masanobu Ohmi, Kasugai (JP); Takashi Hayashi, Nagoya (JP); Atsushi Nabata, Nagakute (JP); Tetsuro Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/182,545

(22) Filed: Feb. 23, 2021

(65) Prior Publication Data

US 2021/0284182 A1 Sep. 16, 2021

(30) Foreign Application Priority Data

Mar. 10, 2020 (JP) .............................. JP2020-041206

(51) Int. Cl.
*B60W 50/04* (2006.01)
*G08G 1/123* (2006.01)
(Continued)

(52) U.S. Cl.
CPC .......... *B60W 50/045* (2013.01); *B60W 40/13* (2013.01); *G08G 1/093* (2013.01);
(Continued)

(58) Field of Classification Search
CPC ............... B60W 50/045; B60W 40/13; B60W 2050/048; B60W 2554/4041; G08G 1/093; G08G 1/123; G08G 1/202; H04W 4/46; G06Q 10/0631; G06Q 30/0284; G06Q 30/0645; G06Q 50/30
See application file for complete search history.

(56) References Cited

U.S. PATENT DOCUMENTS 10,611,412 B1 * 4/2020 Attia ..................... B62D 21/15

FOREIGN PATENT DOCUMENTS

JP 2015-118653 A 6/2015

* cited by examiner

*Primary Examiner* — Yuen Wong
(74) *Attorney, Agent, or Firm* — Oliff PLC

(57) ABSTRACT

An information processing apparatus includes a controller configured to execute the processing of finding, in connection with a first vehicle whose cabin unit and travel unit are separable from each other and that is scheduled to travel a first section of road in which travelling with a travel unit of a first type is suitable and provided with a travel unit of a second type different from the first type, a second vehicle that is scheduled to travel the first section in the direction opposite to the direction of travel of the first vehicle and finish travelling the first section and provided with a travel unit of the first type, and instructing the first vehicle and the second vehicle to exchange the travel unit of the first type and the travel unit of the second type.

20 Claims, 12 Drawing Sheets

(51) Int. Cl.
  *G08G 1/09* (2006.01)
  *H04W 4/46* (2018.01)
  *B60W 40/13* (2012.01)
(52) U.S. Cl.
  CPC .............. *G08G 1/123* (2013.01); *H04W 4/46* (2018.02); *B60W 2050/048* (2013.01); *B60W 2554/4041* (2020.02)

[Fig. 1]
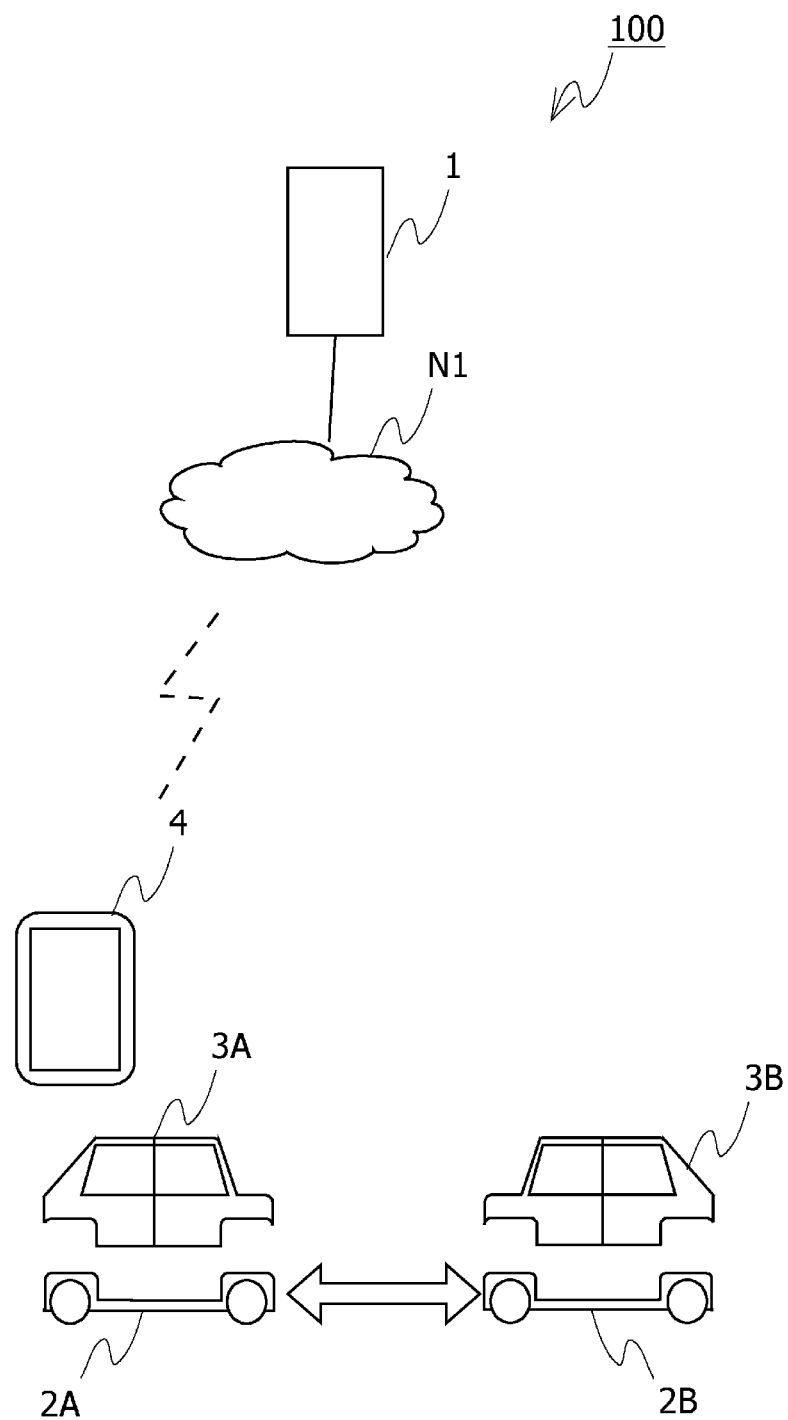

[Fig. 2]
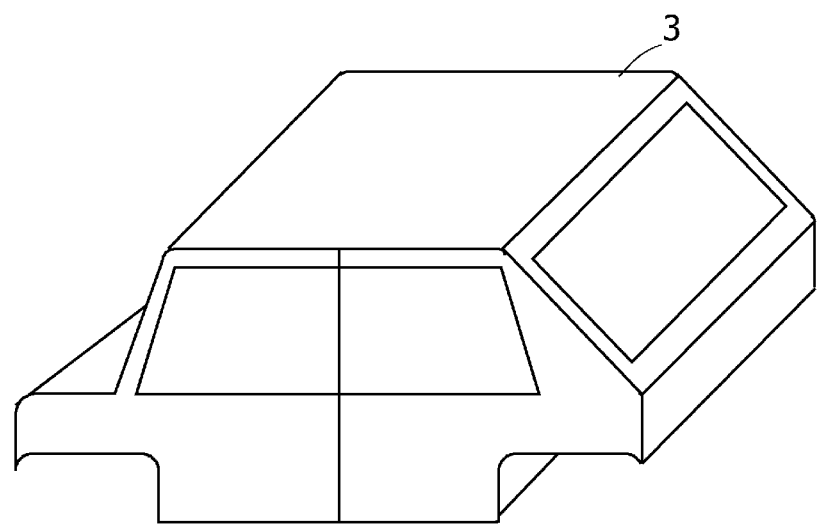
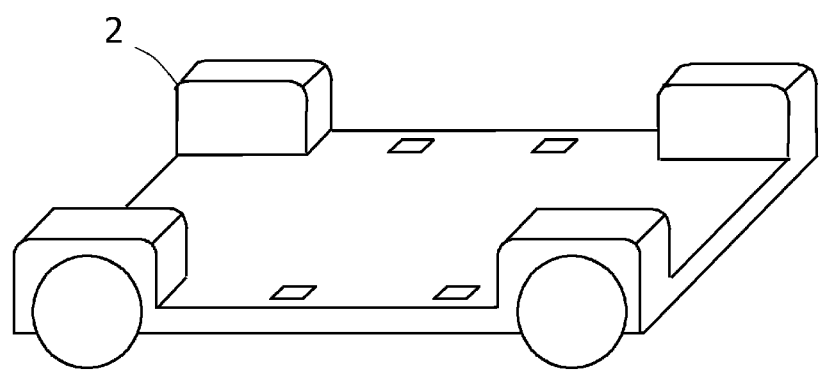

[Fig. 3]
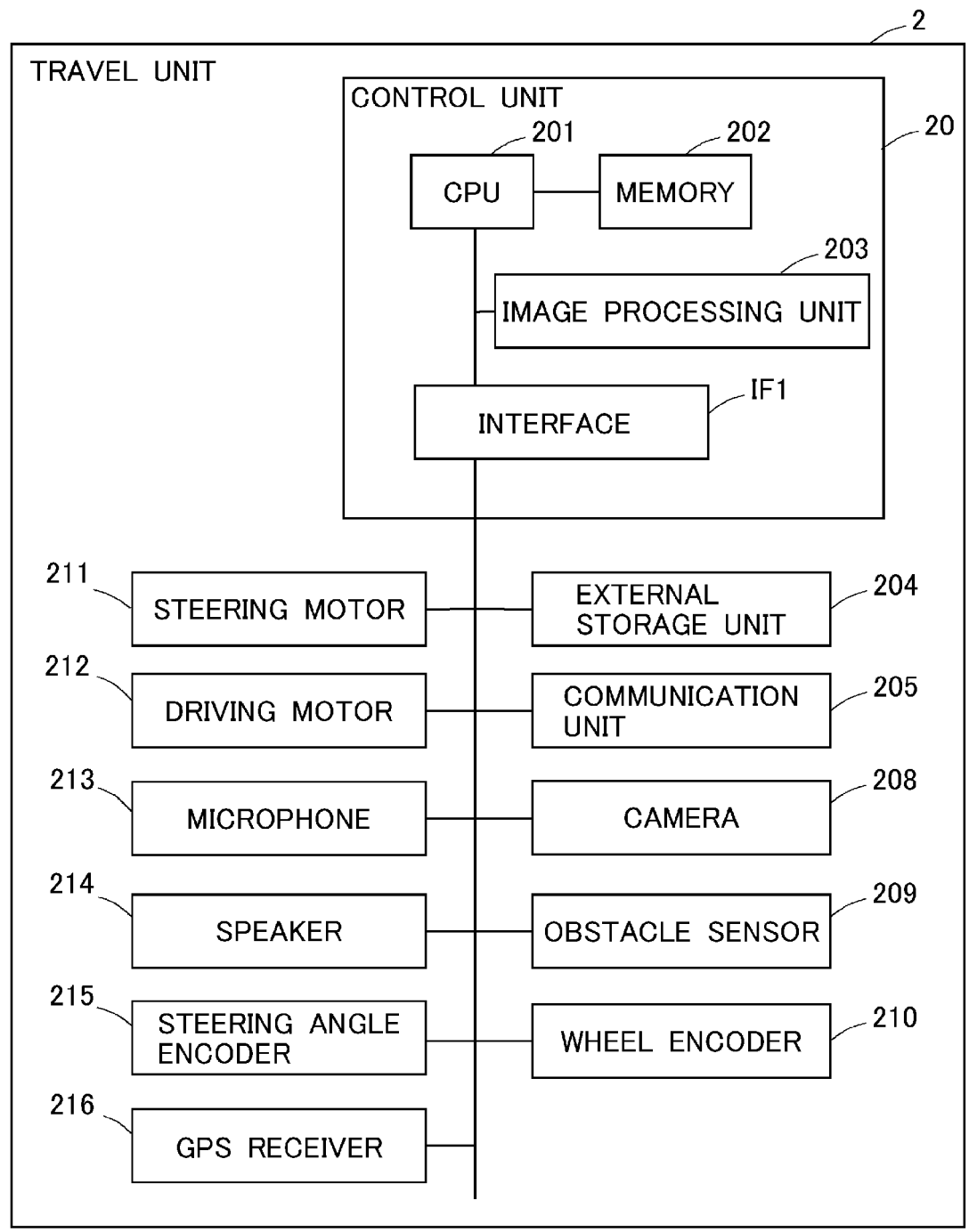

[Fig. 4]
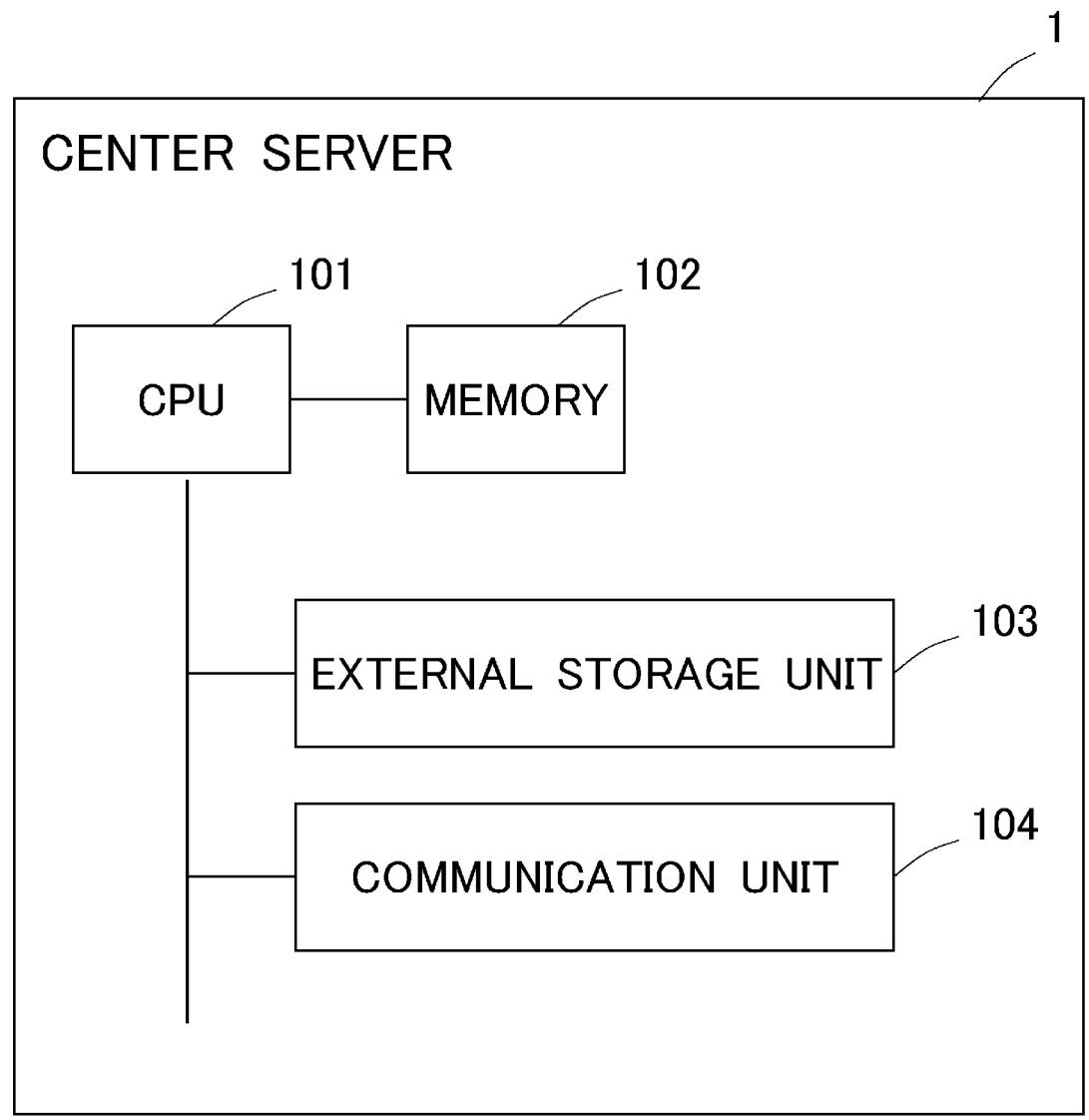

[Fig. 5]
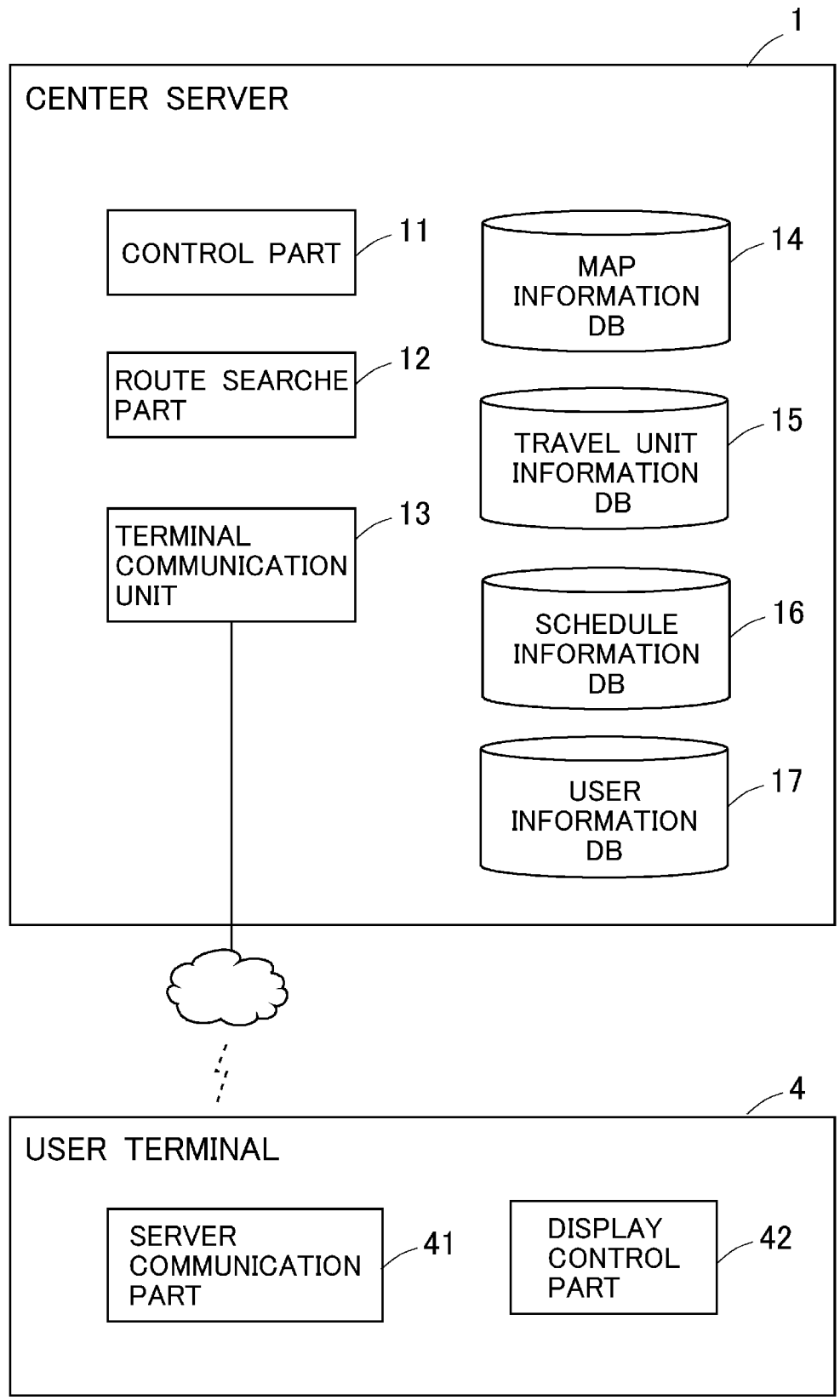

[FIG. 6]

TRAVEL UNIT INFORMATION TABLE

| TRAVEL UNIT ID | BATTERY CAPACITY | DRIVE TYPE | EXPRESSWAY TRAVEL CAPABILITY | MINIMUM TURNING RADIUS | LOCATION INFORMATION | SCHEDULE ID |
|---|---|---|---|---|---|---|
| UD001 | 30kWh | 4WD | CAPABLE | 5.7m | | |
| UD002 | 24kWh | 2WD | CAPABLE | 4.7m | | |
| ... | | | | | | |

[Fig. 7]

SPECIFIC SECTION INFORMATION

| SECTION ID | LOCATION | PROPERTIES | COLD AREA | STATION #A | STATION #B |
|---|---|---|---|---|---|
| B001 | | MOUNTAIN ROAD | NO | ST11 | ST12 |
| B002 | | MOUNTAIN ROAD | NO | ST21 | ST22 |

[FIG. 8]

SCHEDULE INFORMATION TABEL

| SCHEDULE ID | USER ID | PLACE OF DEPARTURE | SCHEDULED DATE AND TIME OF DEPARTURE | DESTINATION | SCHEDULED DATE AND TIME OF ARRIVAL |
|---|---|---|---|---|---|
| SK001 | US01 | STR01 | TM11 | DS01 | TM12 |
| SK002 | US02 | STR02 | TM21 | DS02 | TM22 |

| STOPOVER PLACE #1 | | STOPOVER PLACE #2 | | ... |
|---|---|---|---|---|
| STATION ID | SCHEDULED DATE AND TIME OF ARRIVAL #1 | STATION ID | SCHEDULED DATE AND TIME OF ARRIVAL #2 | |
| ST11 | TM13 | ST12 | TM13 | |
| ST11 | TM23 | ST11 | TM23 | |

[Fig. 9]

TRAVEL UNIT USE INFORMATION TABLE

| SCHEDULE ID | SECTION #1 | | SECTION #2 | | |
|---|---|---|---|---|---|
| | SECTION ID | TRAVEL UNIT ID | SECTION ID | TRAVEL UNIT ID | |
| SK001 | – | UD111 | B001 | UD001 | ・・・ |
| SK002 | – | UD211 | B001 | UD001 | |

[Fig. 10]
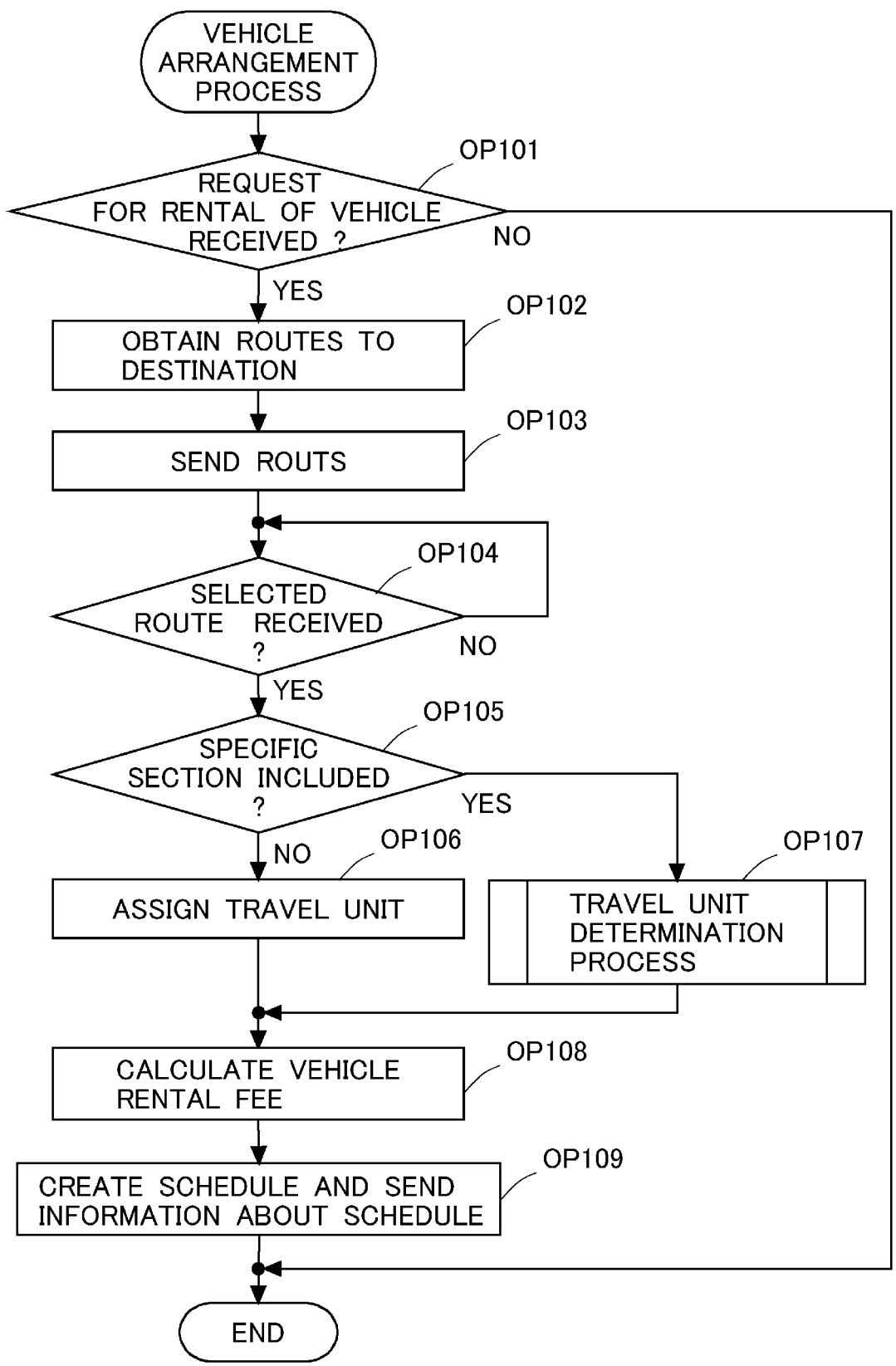

[Fig. 11]
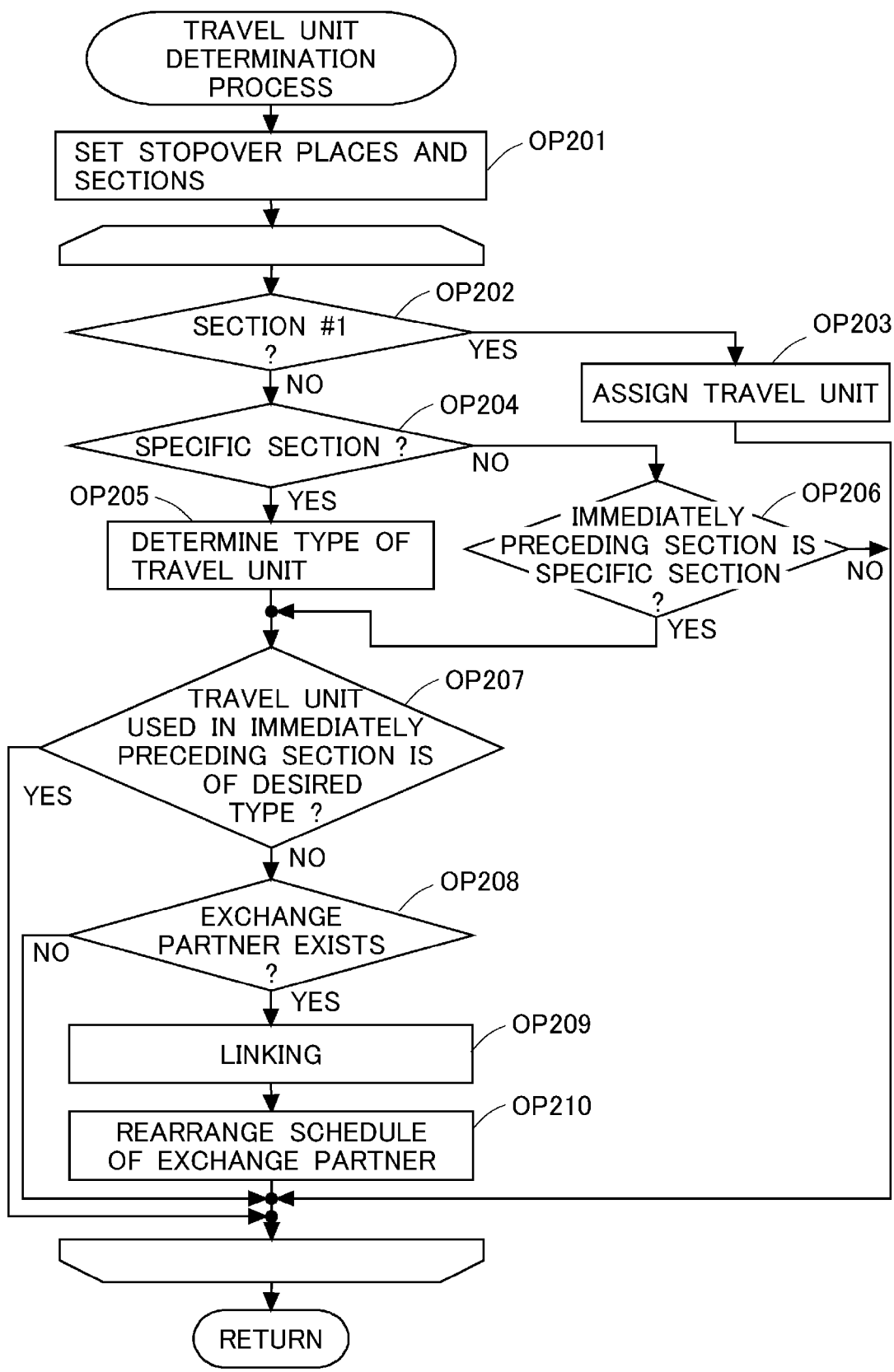

[Fig. 12]
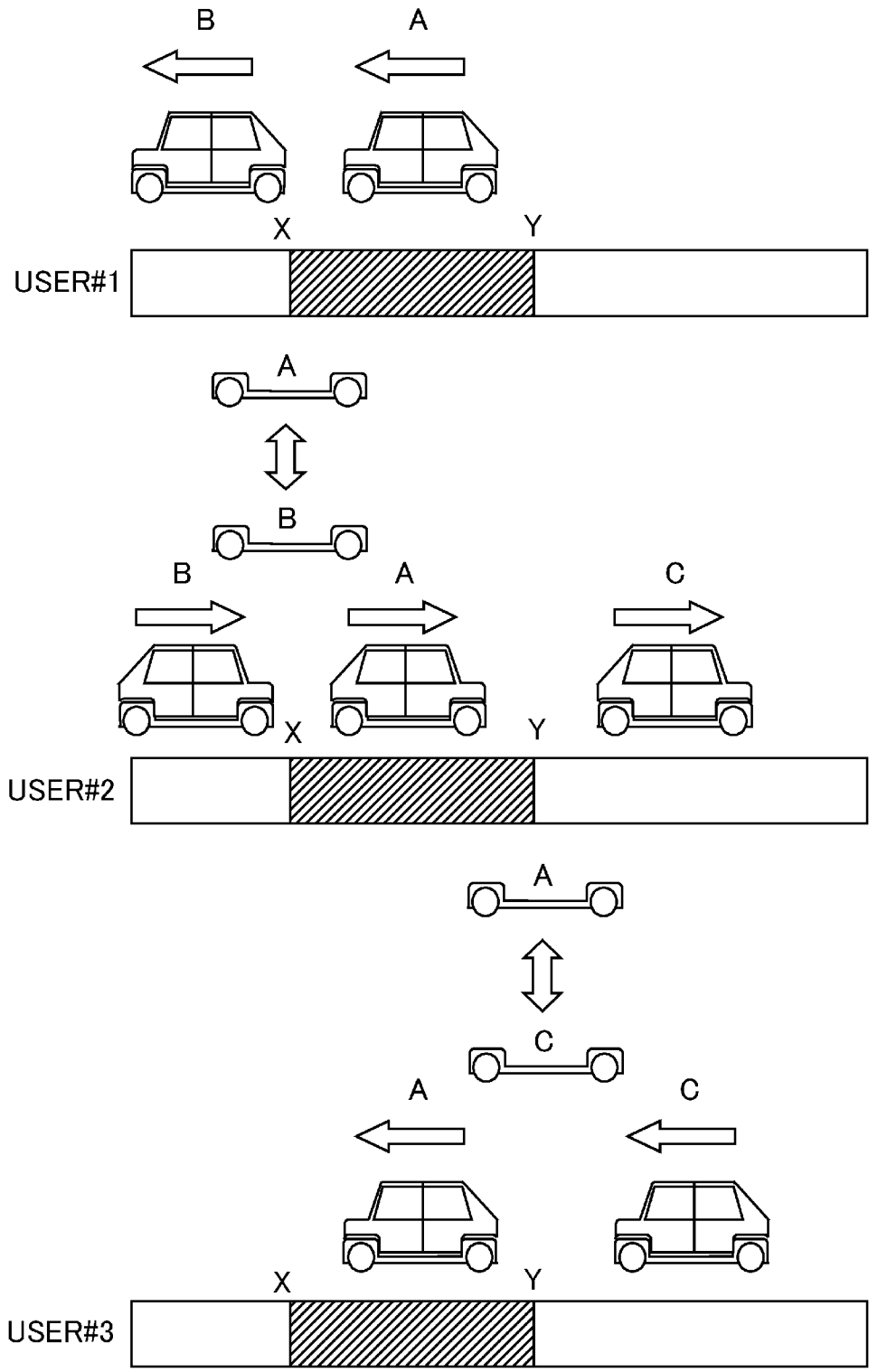

INFORMATION PROCESSING APPARATUS, INFORMATION PROCESSING SYSTEM, AND INFORMATION PROCESSING METHOD

CROSS REFERENCE TO RELATED APPLICATIONS

This application claims the benefit of Japanese Patent Application No. 2020-041206, filed on Mar. 10, 2020, which is hereby incorporated by reference herein in its entirety.

BACKGROUND

Technical Field

This disclosure relates to an information processing apparatus, an information processing system, and an information processing method.

Description of the Related Art

There are known vehicles with interchangeable body units (see, for example, Patent Document 1 in the citation list below). Such vehicles allow users thereof to obtain information about body units and negotiate with other users for exchanges of body units.

CITATION LIST

Patent Literature

Patent Literature 1: Japanese Patent Application Laid-Open No. 2015-118653

SUMMARY

An object of a mode of this disclosure is to provide an information processing apparatus, an information processing system, and an information processing method that can reduce the cost of equipment in a system for renting vehicles whose cabin unit and travel unit are separable from each other.

Disclosed herein is an information processing apparatus comprising a controller equipped with at least one processor, the controller configured to execute the processing of:
finding, in connection with a first vehicle whose cabin unit and travel unit are separable from each other and that is scheduled to travel a first section of road in which travelling with a travel unit of a first type is suitable and provided with a travel unit of a second type different from the first type, a second vehicle that will finish travelling the first section and provided with a travel unit of the first type; and
instructing the first vehicle and the second vehicle to exchange the travel unit of the first type and the travel unit of the second type.

Also disclosed herein is an information processing system comprising a controller at least one processor,
the controller configured to execute the processing of:
finding, in connection with a first vehicle whose cabin unit and travel unit are separable from each other and that is scheduled to travel a first section of road in which travelling with a travel unit of a first type is suitable and provided with a travel unit of a second type different from the first type, a second vehicle provided with a travel unit of the first type that will finish travelling the first section; and
instructing the first vehicle and the second vehicle to exchange the travel unit of the first type and the travel unit of the second type.

Also disclosed herein is an information processing method comprising:
finding, in connection with a first vehicle whose cabin unit and travel unit are separable from each other and that is scheduled to travel a first section of road in which travelling with a travel unit of a first type is suitable and provided with a travel unit of a second type different from the first type, a second vehicle provided with a travel unit of the first type that will finish travelling the first section; and
instructing the first vehicle and the second vehicle to exchange the travel unit of the first type and the travel unit of the second type.

Also disclosed herein is a program configured to cause a computer to implement the above information processing method and a non-transitory storage medium in which such a program is stored in a computer-readable manner.

The technology disclosed herein enables a reduction of the cost of equipment in a system for renting vehicles whose cabin unit and travel unit are separable from each other.

BRIEF DESCRIPTION OF THE DRAWINGS

FIG. 1 is a diagram illustrating an exemplary configuration of a vehicle rental system according to a first embodiment.

FIG. 2 is a first diagram illustrating an exemplary separable vehicle.

FIG. 3 is a second diagram illustrating an exemplary hardware configuration of a travel unit.

FIG. 4 is a diagram illustrating an exemplary hardware configuration of a center server according to a first embodiment.

FIG. 5 is a diagram illustrating exemplary functional configurations of the center server and a user's terminal in the vehicle rental system.

FIG. 6 illustrates an exemplary travel unit information table.

FIG. 7 illustrates an exemplary specific section information table.

FIG. 8 illustrates an exemplary schedule information table.

FIG. 9 illustrates an exemplary travel unit use information table.

FIG. 10 is a flow chart of an exemplary process of arranging for a vehicle performed by a center server.

FIG. 11 is a flow chart of an exemplary process of determining travel units to be used in respective sections.

FIG. 12 is a diagram illustrating a case where travel units are interchanged between vehicles in their routes to their destinations.

DESCRIPTION OF THE EMBODIMENTS

The technology disclosed herein provides, in an aspect, an information processing apparatus having a controller. The controller is configured to find, for a first separable vehicle that has a cabin unit and a travel unit separable from each other and is scheduled to travel a first section (of a road), a second separable vehicle having a travel unit for which the travel unit of the first vehicle can be exchanged. The first section is a section for which travelling with a first type travel unit is suitable. The first vehicle has a travel unit of a second type that is different from the first type. The second vehicle has a travel unit of the first type. The second vehicle is a vehicle that is scheduled to travel the first section in the direction opposite to the first vehicle and finish travelling (or leave) the first section. The controller instructs the first vehicle and the second vehicle to exchange the first type travel unit (of the second vehicle) and the second type travel unit (of the first unit). The information processing apparatus may be a server. The vehicles may be either autonomous-driving vehicles or vehicles driven by drivers in their cabins.

The first section of the road may be, for example, a section including a mountain road or a snow-covered road. The first type travel unit may be, for example, a four-wheel drive travel unit or a travel unit with studless snow tires or tires with chains. The second type travel unit may be, for example, a two-wheel drive travel unit with normal tires.

When a vehicle whose cabin unit and travel unit can be separated from each other is rented, the lessee or a person who rent the vehicle may wish to use a four-wheel drive travel unit for the travel through a certain section of road, such as a mountain road, in the routes to his/her destination. On the other hand, the lessor or the entity that rents out the vehicle wishes to keep the number of travel units prepared for rental appropriate, namely not too much and not too small.

In a mode, the information processing apparatus disclosed herein links the first vehicle that is scheduled to travel through the first section and the second vehicle that is scheduled to finish travelling the first section to let their travel units be exchanged. Thus, one first-type travel unit suitable for travelling in the first section and one second-type travel unit are enough for the two vehicles (i.e. the first and second vehicles), eliminating the need for preparing two first type travel units and two second type travel units.

In a mode, the controller may calculate a fee to be paid by the user of the first vehicle for the use of the first type vehicle on the basis of the length of time of travel with the first-type travel unit. While the rental fees of the travel units may vary depending on differences in their performances and their prices as products, persons who rent vehicles generally wish to make the rental fee smaller. The information processing apparatus of this mode allows the rental fee of the first type travel unit to be reduced, and therefore the user can rent the vehicle with a smaller fee.

In the following an embodiment of the technology disclosed herein will be described. It is to be understood that the embodiment will be described only for illustrative purpose, and its features are not intended to limit the technology disclosed.

First Embodiment

FIG. 1 is a diagram illustrating an exemplary configuration of a vehicle rental system 100 according to a first embodiment. The vehicle rental system 100 is a system that provides the service of renting out vehicles whose travel unit and cabin unit can be separated from and coupled to each other. The vehicle rental system 100 includes, for example, a center server 1, a plurality of travel units 2, a plurality of cabin units 3, and user's terminals 4.

The center server 1 is a server that conducts management of travel units 2 and cabin units 3 and controls rental of vehicles composed by coupling travel units 2 and cabin units 3. The user's terminal 4 is, for example, a terminal in which an application for using the service provided by the vehicle rental system 100 is installed. The vehicle rental system 100 includes a plurality of user's terminals 4, though FIG. 4 shows only one user's terminal 4 for the sake of simplicity. While FIG. 1 shows travel units 2A and 2B, they or one of them will also be denoted as travel units 2 or a travel unit 2, where it is not necessary to distinguish individual travel units. Likewise, while FIG. 1 shows cabin units 3A and 3B, they or one of them will also be denoted as cabin units 3 or a cabin unit 3, where it is not necessary to distinguish individual travel units.

The center server 1 and the user's terminals 4 are connected to a network N1, such as the Internet and can communicate with each other through the network N1.

In the system of the first embodiment, when the user of a user's terminal 4 wishes to rent a vehicle, he or she sends a request for rental of a vehicle with information about a place of departure and a destination and information about desired date and time of departure or arrival to the center server 1. When the center server 1 receives the request for rental of a vehicle from the user's terminal 4, it obtains a route to the destination.

The center server 1 determines whether the route obtained as above includes a specific section. The specific section is a section that includes a road of specific properties, such as a mountain road or a snow-covered road. The specific section is a section of a road in which travelling with a travel unit 2 with specific equipment, such as a four-wheel drive travel unit 2 or a travel unit 2 having studless snow tires or tires with chains, is desirable The specific sections are cataloged in advance.

When the route includes a specific section, the center server 1 links the user who made the request for rental with another user of a vehicle that has a travel unit 2 of a type suitable for travelling in the specific section for which the travel unit of a vehicle to be used by the user who made the request for rental can be exchanged and creates a schedule of exchange of the travel units 2. For example, in a case where the specific section is a mountain road, if there is a vehicle having a travel unit 2 with equipment suitable for travelling in the mountain road and will being finish travelling down the mountain road before the vehicle of the user who made the request for rental will enter the mountain road, the center server creates a schedule that causes these vehicles to exchange their travel units 2.

For example, the user who made the request for rental travels to the specific section by a vehicle composed of a travel unit 2A and a cabin unit 3A and meets a vehicle having a travel unit 2B suitable for travelling in the specific section at a certain place near the specific section to exchange the travel unit 2A and the travel unit 2B.

Thus, the user who rents a vehicle composed of a cabin unit and a travel unit that can be separated from each other exchanges its travel unit 2 for the travel unit of a vehicle that has finished travelling the specific section before the user's vehicle enters the specific section and travels the specific section by the vehicle with the travel unit 2 suitable for travelling in the specific section. Therefore, the vehicle rental system 100 need not prepare a travel unit 2 suitable for travelling in the specific section at a place near one end of the specific section, and it is possible to reduce the number of travel units 2 with equipment suitable for travelling in the specific section prepared for rental.

(Separable Vehicle)

FIG. 2 is a diagram illustrating an exemplary separable vehicle. It is assumed that the system according to the first embodiment uses separable vehicles whose cabin units 3 and travel units 2 can be separated from each other. An example of the separable vehicle is a vertically separable vehicle illustrated in FIG. 2, which includes a cabin unit 3 and a travel unit 2 that can be separated in the vertical direction, though the separable vehicle is not limited to the vertically separable vehicle. For example, the separable vehicles may be a front-and-rear separable vehicle including a cabin unit and a travel unit coupled to the front of the cabin unit and adapted to tow the cabin unit. The travel unit 2 and the cabin unit 3 are coupled in a certain way. The way of coupling the travel unit 2 and the cabin unit 3 is not limited to a specific way, but any existing coupling technique may be employed. Examples of coupling of the travel unit 2 and the cabin unit 3 include coupling using a separable coupling mechanism an coupling by an electromagnet. In the case of the vertically separable vehicle, the cabin unit 3 may be loaded onto or unloaded from the travel unit 2 using a dedicated lift. Alternatively, the cabin unit 3 or the travel unit 2 may be provided with means for loading/unloading the cabin unit 3 onto/from the travel unit 2. The method of loading/unloading the cabin unit 3 of the vertically separable vehicle onto/from the travel unit 2 is not limited to a specific method.

FIG. 3 is a diagram illustrating an exemplary hardware configuration of the travel unit 2. It is assumed that the travel units 2 used in the system according to the first embodiment are electric autonomous cars capable of travelling autonomously. Accordingly, what is illustrated in FIG. 3 is a hardware configuration of a travel unit 2 that is assumed to be an electric vehicle capable of travelling autonomously. FIG. 3 illustrates hardware relating to the control system of the travel unit 2 in particular. The travel unit 2 may be a manually driven car that is driven by a human driver by operating a steering wheel, an accelerator, and brake etc. provided in the travel unit 2 or the cabin unit.

The travel unit 2 has a control unit 20, an external storage device 204, a communication unit 205, a camera 208, an obstacle sensor 209, a wheel encoder 210, a steering motor 211, a driving motor 212, a microphone 213, a speaker 214, a steering angle encoder 215, and a GPS (Global Positioning System) receiver 216.

The control unit 20 is also called an electronic control unit (ECU). The control unit 20 includes a CPU 201, a memory 202, an image processing unit 203, and an interface IF1. To the interface IF1 are connected the external storage device 204, the communication unit 205, the camera 208, the obstacle sensor 209, the wheel encoder 210, the steering motor 211, the driving motor 212, the microphone 213, the speaker 214, the steering angle encoder 215, and the GPS receiver 216.

The obstacle sensor 209 may be, for example, an ultrasonic sensor or a radar. The obstacle sensor 209 radiates ultrasonic waves or electromagnetic waves or the like in the sensing direction and detects the presence, the location, and the relative speed of obstacles present in the sensing direction on the basis of reflected waves. Examples of the obstacles include pedestrians, bicycles, structures, and buildings. In the case where the travel unit 2 has a box shape as shown in FIG. 3, it is provided with a plurality of obstacle sensors 209 at the four corners of the travel unit 2 with respect to the front, rear, left, and right. The front and the rear of the travel unit are determined, for example, in accordance with its direction of travel.

The camera 208 is an image pickup device using an image sensor such as a CCD (Charge-Coupled Device) sensor, a MOS (Metal-Oxide Semiconductor) sensor, or a CMOS (Complementary Metal-Oxide Semiconductor) sensor. The camera 208 picks up images at a predetermined interval called frame period and stores the images in a frame buffer in the control unit 20. The travel unit 2 has a plurality of cameras 208, which are disposed at the front, rear, left, and right sides of the travel unit 2 and oriented outward.

The steering motor 211 controls the direction of the crossing lines of the planes of rotation of the wheels and the horizontal plane, namely the angle of the direction of travel resulting from the rotation of the wheels according to a command signal from the control unit 20. The driving motor 212 drives or rotates the wheels of the travel unit 2 according to a command signal from the control unit 20. The driving motor 212 may drive one of the front and rear pairs of wheels.

The steering angle encoder 215 senses the steering angle or the direction of travel of the wheels at predetermined intervals and stores its values in a register of the control unit 20. The steering angle is the angle of the rotational axis of the wheels in the horizontal plane. The origin of this angle is set in the direction in which the rotational axis of the wheels is perpendicular to the direction of travel of the travel unit 2. The wheel encoder 210 senses the rotational angle of the wheels at predetermined intervals and stores its values in the register of the control unit 20.

The communication unit 205 is a unit that connects itself to, for example, a Wifi access point or a cellular phone base station and communicates with servers or the like on the network via a public communication network connected thereto. The communication unit 205 performs wireless communication by wireless signal and wireless communication scheme compliant with a specific wireless communication standard.

The GPS receiver 216 receives time signal waves from a plurality of global positioning satellites revolving around the earth and stores them in the register of the control unit 20. The microphone 213 senses sounds, converts them into digital signals, and stores the digital signals in the register of the control unit 20. The speaker 214 is driven by a D/A converter and an amplifier connected to the control unit 20 or a signal processor to reproduce sounds including voices.

The CPU 201 of the control unit 20 executes computer executable programs loaded into the memory 202 to perform processing as the control unit 20. The memory 202 stores computer programs executed by the CPU 201 and data processed by the CPU 201. The memory 202 is, for example, a DRAM (Dynamic Random Access Memory), an SRAM (Static Random Access Memory), or a ROM (Read Only Memory). The image processing unit 203 processes frame buffer data sent from the camera 208 every frame period in cooperation with the CPU 201. The image processing unit 203 includes a GPU and an image memory serving as a frame buffer. The external storage unit 204 is a nonvolatile storage unit, which may be, for example, a solid state drive (SSD) or a hard disk drive.

The control unit 20 receives sensor signals from the sensors of the travel unit 2 through the interface IF1. The control unit 20 calculates the latitude and the longitude indicating a location on the earth using signals received by the GPS receiver 216. Moreover, the control unit 20 retrieves map data in the map information database stored in the external storage unit 204 and compares the latitude and the longitude calculated as above with locations in the map data to determine the present location. The control unit 20 obtains a route from the present location to a destination on the map data. The control unit 20 detects obstacles present around the travel unit 2 on the basis of signals from the obstacle sensor 209 and the camera 208, determines the direction of travel, and controls the steering angle in such a way as to avoid obstacles.

The control unit 20 processes data of each frame of images received from the camera 208 in cooperation with the image processing unit 203 to detect obstacles by, for example, detecting changes based on differences in images. The control unit 20 may send frame data of images received from the camera 208 and sound data received from the microphone 213 to the center server 1 on the network. In this case, the analysis of the frame data of images and sound data may also be performed by the center server 1.

While FIG. 3 illustrates the interface IF1, signal communications between the control unit 20 and components controlled by it are not limited to those through the interface IF1. In other words, the control unit 20 may have a plurality of signal communication paths other than that through the IF1. While the control unit 20 illustrated in FIG. 3 has only one CPU 201, the CPU of the control unit 20 is not limited to one, but the control unit may have a multi-processor configuration. A single CPU connected by a socket may have a multicore configuration. The processing of the above-described components may be performed at least partly by a processor other than the CPU, such as a special-purpose processor like a digital signal processor (DSP) and/or a graphics processing unit (GPU). The processing of the above-described components may be performed at least partly by an integrated circuit (IC) or other digital circuits. The above-described components may partly include analogue circuits.

(Configuration of Center Server)

FIG. 4 is a diagram illustrating an exemplary hardware configuration of the center server 1 according to the first embodiment. The center server 1 may be, for example, a special-purpose computer or a general-purpose computer. The center server 1 has, as hardware components, a CPU 101, a memory 102, an external storage device 103, and a communication unit 104. The memory 102 and the external storage device 103 are computer-readable storage media. The center server 1 is an example of the information processing apparatus.

The external storage device 103 stores various programs and data used by the CPU 101 when it executes programs. The external storage device 103 may be, for example, an erasable programmable ROM (EPROM) or a hard disk drive. Examples of the programs stored in the external storage device 103 include an operating system (OS), a control program of the vehicle rental system 100, and other application programs. The control program of the vehicle rental system 100 is a program for controlling rental of cabin units 3 and travel units 2 in response to requests for rental made by users.

The memory 102 is a storage device that provides a memory space and a workspace into which programs stored in the external storage device 103 are loaded and is used as a buffer. Examples of the memory 102 include a semiconductor memory such as a ROM (Read Only Memory) and a RAM (Random Access Memory).

The CPU 101 executes various processing by loading the OS and various application programs stored in the external storage device 103 into the memory 102 and executing them. The number of the CPUs 101 in the center server 1 is not limited to one, but the center server 1 may have a plurality of CPUs. The CPU 101 is an example of the controller.

The communication unit 104 is an interface through which information is input from and output to the network. The communication unit 104 may be either an interface connected to a wired network or an interface connected to a wireless network. The communication unit 104 may be, for example, a network interface card (NIC) or a wireless communication circuit. The communication unit 104 connects itself to a local area network (LAN) and to a public network through the LAN and communicates with the various severs and user's terminals 4 through the public network.

The hardware configuration of the center server 1 illustrated in FIG. 4 is given only by way of example. Some components of the center server 1 may be eliminated or replaced with other components, or other components may be added. For example, the center server 1 may have a drive apparatus for a portable recording medium and execute programs stored in the portable recording medium. Examples of the portable recording medium include an SD card, a mini SD card, a micro SD card, a USB (Universal Serial Bus) flash memory, a CD (Compact Disc), a DVD (Digital Versatile Disc), a Blu-ray (registered trademark) disc, and a flash memory card. The center server 1 may be provided with an input apparatus and an output apparatus. Examples of the input apparatus include a keyboard, a mouse, and a touch panel. Examples of the output apparatus include a display.

The user's terminal 4 may be, for example, a smartphone, a tablet terminal, a personal computer (PC), or a wearable terminal. The user terminal 4 has, as hardware components, a CPU, a memory, an external storage device, a communication unit, a touch panel display, a speaker, a microphone, a camera, a GPS receiver, and sensors.

The various processing executed by the center server 1 or the user's terminal 4 is not necessarily implemented by execution of software by a processor. Processing executed by the center server 1 or the user's terminal 4 may be implemented by hardware such as an FPGA (Field-Programmable Gate Array).

FIG. 5 is a diagram illustrating exemplary functional configurations of the center server 1 and the user's terminal 4 in the vehicle rental system 100. The center server 1 includes, as functional components, a control part 11, a route search part 12, a terminal communication part 13, a map information database 14, a travel unit information database 15, a schedule information database 16, and user information database 17. These functional components are implemented, for example, by executing control programs of the vehicle rental system 100 stored in the external storage device 103 by the CPU 101 of the center server 1.

The terminal communication part 13 is an interface for communication with the user's terminals 4. For example, the terminal communication part 13 sends data input from the control part 11 to a user's terminal 4 through the communication unit 104. Moreover, the terminal communication part 13 receives data from the user's terminals 4 and outputs the received data to the control part 11. Examples of data sent from a user's terminal 4 include a request for rental of a vehicle, information about a place of departure and a destination, and information about desired date and time of departure or information about desired date and time of arrival. The terminal communication part 13 also receives information about the user with the request for rental of a vehicle. Information about the user includes identification information of the user.

The control part 11 receives from the terminal communication part 13, for example, a request for rental of a travel unit and information about a place of departure and a destination received from a user's terminal 4. Then, the control part 11 makes a request to the route search part 12 for obtainment of routes to the destination and obtains a certain number of routes to the destination. The control part 11 sends information about the routes to the destination to the user's terminal 4 that has sent the request for rental. The information about the routes contains, for example, information about the place of departure and the destination of each route, information about stopover places, information about the time taken to travel to the destination, and information about a toll when the route includes a toll road.

The control part 11 receives from the terminal communication part 13 information about a selected route sent from the user's terminal 4. Then, the control part 11 determines whether or not the selected route includes a specific section by consulting map information database 14, which will be described later. If the selected route includes a specific section, the control part 11 determines the type of travel unit suitable for travelling in the specific section. Then, the control part 11 consults the travel unit information database 15 to search for another vehicle that has a travel unit suitable for travelling in the specific section with which a vehicle to be rented to the user who made the request for rental is to exchange the travel units. The exchange partner vehicle is a vehicle that has a travel unit of the type suitable for travelling in the specific section and is scheduled to finish travelling (or leave) the specific section around an expected time at which the vehicle to be rented to the user who made the request for rental will arrive at a place for exchange near the specific section. Moreover, the exchange partner vehicle is a vehicle that is scheduled to travel the specific section in the direction opposite to the direction in which the vehicle to be rented to the user who made the request will travel. The control part 11 determines a scheduled meeting time at which the user who made the request for rental and the user who is the partner of exchange of the travel units 2 are to meet.

If there is another vehicle that has a travel unit 2 of the type suitable for travelling in the specific section for which the travel unit of the vehicle to be rented to the user who made the request for rental can be exchanged, the control part 11 adds exchange of the travel unit 2 with the other vehicle to a schedule. If there is not another vehicle that has a travel unit 2 of the type suitable for travelling in the specific section for which the travel unit of the vehicle to be rented to the user who made the request for rental can be exchanged, the control part 11 determines, for example, that the vehicle is to travel the specific section with its travel unit 2 unchanged, without adding exchange of the travel unit 2 to a schedule.

The control part 11 sets a schedule of renting a travel unit 2 and a cabin unit 3 to the user who made the request for rental in the selected route. The schedule includes, for example, a place of departure, scheduled date and time of departure, a place of arrival, scheduled date and time of arrival, a stopover place, and scheduled date and time of arrival at the stopover place. An example of the stopover place is a place where exchange of the travel units 2 is to be performed.

The control part 11 monitors the operation of the vehicle (or the travel unit 2) according to schedule information. Specifically, at the time a certain time earlier than the scheduled time of departure, the control part 11 starts the schedule of rental by causing the vehicle composed of the travel unit 2 and the cabin unit 3 to travel to a place designated by the user. After starting the schedule, the control part 11 monitors the location information of the vehicle (or the travel unit 2), and when the vehicle arrives at the stopover place, the control part 11 instructs the vehicle (or the travel unit 2) to exchange the travel units 2 with the exchange partner vehicle.

The route search part 12 obtains routes from the place of departure to the destination in response to the request from the control part 11. The route search part 12 obtains routes to the destination on the basis of information stored in the map information database 14, which will be described later. In obtaining the routes, the route search part 12 may employ any existing method without limitation to a specific method. The route search part 12 obtains a predetermined number of routes and outputs them to the control part 11.

The map information database 14, the travel unit information database 15, a schedule information database 16, and the user information database 17 are created in, for example, a storage area of the external storage device 103 of the center server 1. What is stored in the map information database 14 includes, for example, map information to be used in the route search and information about roads. What is stored in the travel unit information database 15 is information relating to the travel units. Details of the information stored in the travel unit information database 15 will be described later.

What is stored in the schedule information database 16 includes, for example, information about schedules of rental of travel units 2. Information about a schedule of rental of a travel unit 2 includes, for example, identification information of the schedule, identification information of the user who rents the travel unit 2, identification information of the travel unit 2 rented, and information about a place to which the travel unit 2 is to go first. What is stored in the user information database 17 includes, for example, identification information of the users and information about methods of payment designated by the users.

The processing of the functional components of the center server 1 illustrated in FIG. 5 may be implemented either by a single computer or by a plurality of computers in a distributed manner. For example, the map information database 14, the travel unit information database 15, the schedule information database 16, and the user information database 17 may be held by external servers.

The user's terminal 4 includes, as functional components, a server communication part 41 and a display control part 42. These functional components are implemented by, for example, executing a program for using the service of the vehicle rental system 100 stored in the external storage device by the CPU of the user's terminal 4.

The server communication part 41 is an interface for communication with the center server 1. The server communication part 41 sends, for example, data input from the display control part 42 to the center server 1 through the communication unit. The server communication part 41 receives data from the center server 1 through the communication unit and outputs the received data to the display control part 42. Examples of the data sent from the user's terminal 4 to the center server 1 include a request for rental of a vehicle, information about a place of departure and a destination, and information about a route selected from among proposed routes. Examples of the data sent from the center server 1 include information about routes to the destination.

The display control part 42 controls input and output through the touch panel display of the user's terminal 4. Specifically, on the basis of user's input made on the touch panel display, the display control part 42 outputs a request for rental of a travel unit and information about a place of departure and a destination etc. to the server communication part 41 to send them to the center server 1. Moreover, the display control part 42 receives from the server communication part 41 information about routes to the destination received from the center server 1 and displays them on the touch panel display in a specific screen format.

FIG. 6 illustrates an exemplary travel unit information table. The travel unit information table is a table stored in the travel unit information database 15 of the center server 1. What is stored in the travel unit information table is information about the travel units 2 rented out by the vehicle rental system 100. The travel unit information table illustrated in FIG. 6 has the fields of travel unit ID, battery capacity, drive type, expressway travel capability, minimum turning radius, location information, and schedule ID.

What is stored in each travel unit ID field is identification information of the travel unit 2. What is stored in the battery capacity field is the battery capacity of the travel unit 2. What is stored in the drive type field is information indicating the drive type of the travel unit 2. The information indicating the drive type of the travel unit 2 may be, for example, a code or a flag. Examples of the drive type of the travel unit 2 include the four-wheel drive and the two-wheel drive, though the drive type of the travel unit 2 is not limited to them. In FIG. 6, in the case where the travel unit 2 is a four-wheel drive unit, the information "4WD" is stored in the drive type field. In the case where the travel unit 2 is a two-wheel drive unit, the information "2WD" is stored in the drive type field.

What is stored in the expressway travel capability field is information indicating whether the travel unit 2 is capable of travelling expressways. Whether or not a travel unit is capable of travelling expressways depends on the nominal output power of the motor of the travel unit 2, the size of the travel unit, and/or other factors.

What is stored in the minimum turning radius field is the value of the minimum turning radius of the travel unit 2. The minimum turning radius is an index of the sharp cornering capability of the travel unit 2. The indices of the sharp cornering capability of the travel unit 2 are not limited to the minimum turning radius. Other indices are, for example, the tire size and the wheelbase.

What is stored in the location information field is location information of the travel unit 2. The location information of the travel unit 2 may be, for latitude and longitude or address. Each travel unit 2 sends its location information to the center server 1 at regular intervals. When receiving the location information of a travel unit 2, the control part 11 updates the location information field of that travel unit 2 in the travel unit information table. What is stored in the schedule ID field is identification information of a schedule assigned to the travel unit 2. When no schedule is assigned to the travel unit 2, the schedule information field is left blank.

The information in the travel unit ID field, the battery capacity field, the drive type field, the expressway travel capability field, and the minimum turning radius field is input in advance by an administrator of the center server 1. The location information field is updated every time location information is received from the travel unit 2. The value of the schedule ID field is updated by the control part 11 when a schedule is set for the travel unit 2. The information stored in the travel unit information table is not limited to that illustrated in FIG. 6.

FIG. 7 illustrates an exemplary specific section information table. The specific section information table is a table stored in the map information database 14 of the center server 1. The specific section information table is a table in which information about the specific sections is stored.

The specific section information table illustrated in FIG. 7 has the fields of section ID, location, properties, cold area, station #A, and station #B. What is stored in the section ID field is identification information of each specific section. What is stored in the location field is location information of the specific section.

What is stored in the properties field is information indicating properties of the road included in the specific section. Examples of the properties of the road included in the specific section indicated in the properties field include expressway, mountain road, and narrow road. These properties are indicated by, for example, codes or flags, though in FIG. 7 words expressing properties of the road in the specific sections are written in the properties field for the sake of explanation.

What is stored in the cold area field is information indicating whether or not the specific section is in a cold area. Information indicating whether or not the specific section is in a cold area is, for example, a code or flag, though in FIG. 7 YES or NO is written as information indicating whether or not the specific section is in a cold area for the sake of explanation. Cold areas are regarded as areas including snow-covered roads in winter, because it is probable that the roads in cold areas are covered with snow in winter.

What is stored in the station #A field and the station #B field is identification information of places for exchange of travel units 2 located respectively near the ends of the specific section. The places for exchange (namely, the places where exchanges of travel units 2 are to be performed) are determined in advance. Examples of the places used as the places for exchange of travel units 2 include, a parking space near a toll gate of an expressway, a parking lot near a starting point of a mountain road, and a service station of the enterprise that provides the service of the vehicle rental system 100. In the following description, a place where exchange of travel units 2 is performed will be referred to as a "station". A link of the identification information of each station and the location information thereof is also stored in the map information database 14.

The specific section information table is used in the process of determining whether or not a route from a place of departure to a destination includes a specific section and the process of determining the type of travel unit 2 that is suitable for travelling in the specific section included in the route. For example, a route from a place of departure to a destination includes a specific section having the properties of mountain road, a four-wheel drive travel unit 2 is selected. The information stored in the specific section information table is not limited to that illustrated in FIG. 7. For example, information indicating the type of travel unit 2 suitable for travelling in each specific section may be stored in the specific section information table.

FIG. 8 illustrates an exemplary schedule information table. The schedule information table is stored in the schedule information database 16. What is stored in the schedule information table is schedules of rental of travel units 2. The schedule information table illustrated in FIG. 8 has the fields of schedule ID, user ID, place of departure, destination, scheduled date and time of departure, scheduled date and time of arrival, and stopover places #1 and so on.

What is stored in the schedule ID field is identification information of each schedule. What is stored in the user ID field is identification information of each user who rents a vehicle. What is stored in the place of departure field is location information of the place of departure. What is stored in the scheduled date and time of departure field is, for example, scheduled date and time of departure. What is stored in the destination field is location information of the destination. What is stored in the scheduled date and time of arrival field is, for example, scheduled date and time of arrival. The values in the place of departure field and the destination field are, for example, information received from a user's terminal 4 with a request for rental of a vehicle. In cases where a designation of desired date and time of departure or desired date and time of arrival is received with a request for rental of a vehicle, the desired date and time of departure or the desired date and time of arrival is stored in the field of scheduled date and time of departure or the field of scheduled date and time of arrival. When a designation of desired date and time of departure or desired date and time of arrival is not received, scheduled date and time of departure or scheduled date and time of arrival that is determined by the route search is stored in the field of scheduled date and time of departure or the field of scheduled date and time of arrival.

What is stored in the stopover place #N field (N: positive integer) is information about the Nth stopover place. In the system according to the first embodiment, the stopover place means a place where exchange of travel units 2 is performed. The stopover place #N field has the subfields of station ID and scheduled time of arrival #N. What is stored in the station ID subfield is identification information of a station designated as the Nth stopover place. What is stored in the scheduled time of arrival #N subfield is scheduled date and time of arrival at the Nth stopover place.

The schedule information table is used by the control part 11, for example, in controlling operations of vehicles. The schedule information table is also used in searching for an exchange partner of a travel unit 2. The information stored in the schedule information table is not limited to that illustrated in FIG. 8.

FIG. 9 illustrates an exemplary travel unit use information table. The travel unit use information table is stored in, for example, the schedule information database 16. What is stored in the travel unit use information table is information about the travel unit used in each schedule. The travel unit use information table illustrated in FIG. 9 has the fields of schedule ID and sections #1 and so on.

What is stored in the schedule ID field is identification information of each schedule. The schedule ID field links the schedule information table and the travel unit use information table with each other.

The sections in this table are sections delimited by the place of departure, the stopover place(s), and the destination in the route. In the case where there is no stopover place, in other words when the route of a schedule does not include a specific section, there is only one section #1 that spans from the place of departure to the destination in the route. In the case where there is one stopover place as a place for exchange of travel units 2, there are two sections, namely section #1 spanning from the place of departure to the stopover place #1 and section #2 spanning from the stopover place #1 to the destination.

The section #M field (M: positive integer) has the subfields of section ID and travel unit ID. In the case where the section is a specific section, the ID of that specific section is stored in the section ID subfield. In the case where the section is not a specific section, the section ID subfield is left blank. What is stored in the travel unit ID subfield is identification information of the travel unit 2 to be used in the section. The information stored in the travel unit use information table is not limited to that illustrated in FIG. 9.

(Process Performed by Center Server)

FIG. 10 is an exemplary flow chart of a vehicle arrangement process or a process of arranging for a vehicle performed by the center server 1. The vehicle arrangement process is the process of arranging for a travel unit 2 and a cabin unit 3 to be rent in response to a request for rental of a vehicle and setting a schedule. The process according to the flow chart of FIG. 10 is executed repeatedly at regular intervals. While the process illustrated in FIG. 10 is executed by the CPU 101 of the center server 1, each steps of the process will be described as a step executed by a functional component for the sake of explanation.

In step OP101, the control part 11 determines whether or not a request for rental of a vehicle has been received from a user's terminal 4. If a request for rental of a vehicle has been received from a user's terminal 4 (YES in step OP101), the process proceeds to step OP102. If a request for rental of a vehicle has not been received from a user's terminal 4 (NO in step OP101), the process of FIG. 10 is terminated. The request for rental of a vehicle received is accompanied by information about the user and information about a place of departure and a destination.

In step OP102, the control part 11 makes a request to the route search part 12 for route search to obtain information about a predetermined number of routes from the place of departure to the destination. In step OP103, the control part 11 sends information about the predetermined number of routes to the user's terminal to request the user to select a route to be followed. In step OP104, the control part 11 determines whether or not the result of route selection has been received. If the result of route selection has been received from the user's terminal 4 (YES in OP104), the process proceeds to step OP105. If the result of route selection has not been received from the user's terminal 4 (NO in step OP104), the processing of step OP104 is executed once again. If the result of route selection has not been received from the user's terminal 4 after the lapse of a predetermined period of time, the process of FIG. 10 may be terminated or a request for selection of a route to be followed may be sent to the user's terminal 4 once again.

In step OP105, the control part 11 determines whether or not the selected route includes a specific section. The determination in step OP105 is made, for example, by consulting the specific section information table. If the selected route includes a specific section (YES in step OP105), the process proceeds to step OP107. In step OP107, a travel unit determination process is executed. The travel unit determination process is the process of determining travel units 2 to be used in the respective sections in the route. If the selected route does not include a specific section (NO in step OP105), the process proceeds to step OP106.

In step OP106, since the selected route does not include a specific section, the route is composed of only one section, and the control part 11 determines or assigns a travel unit 2 to be used in that section. In the system according to the first embodiment, a two-wheel drive travel unit 2 is used in sections other than specific sections. In step OP106, a cabin unit 3 to be used is also determined. Specifically, the control part 11 may select a cabin unit 3 that meets conditions designated through the user's terminal 4. Alternatively, the control part 11 may send information about available cabin units 3 to the user's terminal 4, and the user may select one of them.

In step OP108, the control part 11 calculates a vehicle rental fee. The vehicle rental fee is determined based on the types of the travel unit 2 and the cabin unit 3, the scheduled lengths of time of travel by the respective travel units 2 (in the case where the travel unit 2 is exchanged), and length of time over which the vehicle is rented.

In step O109, the control part 11 creates a travel schedule for the user and stores it in the schedule information table and the travel unit use information table. Moreover, the control part 11 sends information about the schedule to the user's terminal 4 through the terminal communication part 13. In cases where the schedule includes exchange of travel units 2, the control part 11 also sends information about a changed schedule to the user's terminal 4 of the exchange partner user. Thereafter, the process according to the flow chart of FIG. 10 ends. The process illustrated in FIG. 10 is an exemplary process, to which modifications, such as changes in the order of execution of processing steps and addition and/or deletion of processing steps, may be made.

Now, the travel unit determination process will be described. FIG. 11 is an exemplary flow chart of the travel unit determination process. This process according to the flow chart of FIG. 11 is the process executed in step OP107 in the process according to the flow chart of FIG. 10. In step OP201, the control part 11 sets stopover places and sections in the route. The stopover places are, for example, stations located near the two ends of a specific section included in the route. In determining the stopover places, the control part 11 consults, for example, the specific section information table (FIG. 7).

The processing of steps OP202 to OP209 is executed for each of the sections in the route. In step OP202, the control part 11 determines whether or not the relevant section (i.e. the section for which the processing of steps OP202 to OP209 is executed) is section #1. The determination in step OP202 is made by consulting the travel unit use information table (FIG. 9). If the relevant section is section #1 (YES in step OP202), the process proceeds to step OP203. In step OP203, the control part 11 assigns to the relevant section #1 a travel unit 2 of a type suitable for relevant section #1 for which no schedule is set at the scheduled date and time specified in the schedule.

If the relevant section is not section #1 (NO in step OP202), the process proceeds to step OP204. In step OP204, the control part 11 determines whether or not the relevant section is a specific section. The processing of step OP204 is executed by, for example, consulting the travel unit use information table (FIG. 9). If the relevant section is a specific section (YES in step OP204), the process proceeds to step OP205. In step OP205, the control part 11 determines the type of travel unit suitable for the relevant section as the specific section. The type of the travel unit 2 to be used is determined, for example, based on the properties of the relevant section as the specific section by consulting the specific section information table (FIG. 7).

If the relevant section is not a specific section (NO in step OP204), the process proceeds to step OP206. In step OP206, the control part 11 determines whether or not the section immediately preceding the relevant section is a specific section. The processing of step OP206 is executed, for example, by consulting the travel unit use information table (FIG. 9). If the section immediately preceding the relevant section is a specific section (YES in step OP206), the process proceeds to step OP207. If the section immediately preceding the relevant section is not a specific section (NO in step OP206), the process proceeds to the processing for the next section or the processing of step OP108 in the process according to the flow chart of FIG. 10. In the system according to the first embodiment, the sections are delimited by the place of departure, the destination, and the stopover places, which are stations. Therefore, it is not supposed that two sections that are not specific sections exist consecutively. In other words, it is not supposed in the system according to the first embodiment that the relevant section is not section #1 (NO in step OP202) nor specific section (NO in step OP204), and the immediately preceding section is not a specific section.

In step OP207, the control part 11 determines whether or not the travel unit 2 used in the section immediately preceding the relevant section is in agreement with the type of travel unit 2 suitable for travelling in the relevant section. Information about the travel unit 2 used in the immediately preceding section is obtained, for example, from the travel unit use information table (FIG. 9) and the travel unit information table (FIG. 6).

If the travel unit 2 used in the section immediately preceding the relevant section is in agreement with the type of travel unit 2 suitable for travelling in the relevant section (YES in OP207), it is determined that the transition from the immediately preceding section to the relevant section does not require exchange of travel units 2. Then, the processing for the relevant section ends, and the process proceeds to the processing for the next section or the processing of step OP108 in the process according to the flow chart of FIG. 10. If the travel unit 2 used in the section immediately preceding the relevant section is not in agreement with the type of travel unit 2 suitable for travelling in the relevant section (NO in OP207), the process proceeds to step OP208.

For example, in the case where the relevant section and the section immediately preceding it are specific sections having the same properties, and the types of travel unit 2 suitable for travelling in them are the same, the determination in step OP207 is answered in the affirmative. Even in the case where the relevant section and the section immediately preceding it are specific sections, if their properties are not the same, and the types of travel unit 2 suitable for travelling in them are different, the determination in step OP207 is answered in the negative.

In step OP208, the control part 11 determines whether or not there is another vehicle that uses a travel unit 2 of the type suitable for travelling in the relevant section and scheduled to finish travelling the relevant section, namely another vehicle that can be a partner of exchange of travel units 2. In the processing of step OP208, the control part 11 firstly extracts, for example, from the schedule information table (FIG. 8) schedules according to which a vehicle is scheduled to reach a stopover place at the start point of the relevant section of the relevant vehicle within a certain range of time around the scheduled date and time of arrival of the relevant vehicle while travelling in the direction opposite to the relevant vehicle. Then, if there is a schedule among the extracted schedules according to which the type of the travel unit 2 used in the specific section same as the relevant section agrees with the type of travel unit 2 suitable for travelling in the relevant section, an affirmative determination is made in step OP208. If, for example, no schedules that meet the above condition are extracted from the schedule information table, or even if there are such schedules, if there is no schedule according to which the travel unit 2 that agrees with the type of travel unit suitable for travelling in the relevant section will be used, a negative determination is made in step OP208.

If an affirmative determination is made in step OP208 (YES in step OP208), the process proceeds to step OP209. If a negative determination is made in step OP208 (NO in step OP208), the process proceeds to the processing for the next section or the processing of step OP108 in the process according to the flow chart of FIG. 10. In other words, if there is no partner of exchange of travel units 2, it is determined that the travel unit 2 used in the section immediately preceding the relevant section is to be used in the relevant section without exchange.

In step OP209, the control part 11 establishes a link between the user associated with the schedule found in step OP208 and the relevant user. Specifically, the control part 11 determines a station at which the users will meet and a time of meeting. In step OP210, the control part 11 rearranges the schedule of the partner of exchange of travel units 2 so that the travel units 2 can be exchanged and updates the schedule of the exchange partner user. Since the travel unit 2 will operate pursuant to the schedule, arranging and updating the schedules means instructing the vehicles (or the travel unit 2). Then, the process proceeds to the processing for the next section or the processing of step OP108 in the process according to the flow chart of FIG. 10.

(Operation and Advantageous Effects of System According to First Embodiment)

FIG. 12 illustrates an example of exchange of travel units 2 between vehicles in their route to their destinations. FIG. 12 shows routes of three users #1 to #3, where the hatched portions indicate the same specific section. It is assumed that the user #1, the user #2, and the user #3 travel through the specific section in the mentioned order. There are stations #X and #Y located near the two ends of the specific section. The vehicles used by the user #1, the user #2, and the user #3 will be referred to as vehicle #1, vehicle #2, and vehicle #3 respectively.

The vehicle #1 is scheduled to travel in the direction from the station #Y to the station #X. The vehicle #2 is scheduled to travel in the direction from the station #X to the station #Y. The vehicle #3 is scheduled to travel in the direction from the station #Y to the station #X.

The center server 1 schedules exchange of travel unit #A and travel unit #B at the station X between the user #1 and the user #2. Furthermore, the center server 1 schedules exchange of travel unit #A and travel unit #C at the station Y between the user #2 and the user #3. Among the travel units #A to #C, the travel unit #A is a travel unit 2 of the type suitable for travelling in the specific section.

For the three users #1 to #3, there is only one travel unit #A that is of the type suitable for travelling in the specific section. If exchange of travel units 2 is not performed, there may be cases where a travel unit of the type suitable for travelling in the specific section is prepared for each of the users #1 to #3. The system according to the first embodiment allows a reduction in the number of travel units 2 of a rather special type prepared.

As the schedules are set as above, and the users #1 to #3 exchange the travel units 2 as scheduled, each user (e.g. the user #2) can travel with travel units 2 that are suitable for traveling in the respective sections of the route. Therefore, the system according to the first embodiment can provide travel with improved comfortability.

Moreover, each user (e.g. the user #2) travels with the travel unit #A only in the specific section. This can make the vehicle rental fee to be paid by the user #2 smaller than that in the case where the travel unit #A is used all through the route.

Other Embodiments

The above embodiment has been described only by way of example. Changes can be made to the above embodiment without departing from the essence of the present disclosure.

In the above-description of the embodiment, expressways, bad roads, and narrow roads are mentioned as exemplary properties of roads.

However, properties of roads are not limited to them. In determining travel units 2 to be offered, influences of variable conditions such as whether, disasters, and accidents may be taken into consideration in addition to properties of roads.

The features of the processing and means described in this disclosure may be employed in any combination so long as it is technically feasible to do so.

One, some, or all of the processes that have been described as processes performed by a single apparatus may be performed by a plurality of apparatuses in a distributed manner. One, some, or all of the processes that have been described as processes performed by a plurality of apparatuses may be performed by a single apparatus. The hardware configuration (or server configuration) employed to implement various functions in a computer system may be modified flexibly.

The technology according to this disclosure can be carried out by supplying a computer program(s) (or information processing program(s)) that implements the functions described in the above description of the embodiment to a computer to let one or more processors of the computer read and execute the program(s). Such a computer program(s) may be supplied to the computer by a computer-readable, non-transitory storage medium that can be connected to a system bus of the computer or through a network. Examples of the computer-readable, non-transitory storage medium include any type of disc medium including a magnetic disc, such as a floppy disc (registered trademark) and a hard disk drive (HDD), and an optical disc, such as a CD-ROM, a DVD, and a Blu-ray disc. Further examples of the recording medium include a read-only memory (ROM), a random access memory (RAM), an EPROM, an EEPROM, a magnetic card, a flash memory, an optical card, and any type of medium that is suitable for storage of electronic commands.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising a controller equipped with at least one processor,
the controller configured to execute processing of:
finding a first vehicle whose cabin unit and travel unit are separable from each other and is scheduled to travel a first section of road in a direction of travel with a first type travel unit, finding a second vehicle whose cabin unit and travel unit are separable from each other is scheduled to travel the first section in a direction opposite to the direction of travel of the first vehicle and finish travelling a second section with a second type travel unit, wherein the second type travel unit is selected and provided for continued travel for the first vehicle in a second section of road after the first section of road, wherein the travel unit of the second type is selected based on at least a capability to travel the second section of road; and
instructing the first vehicle and the second vehicle to exchange the first type travel unit and the second type travel unit in order that the first vehicle continues travelling with the second type travel unit in the second section of the road.

2. The information processing apparatus according to claim 1, wherein the controller is configured to further execute the processing of:
when the first vehicle provided with the second type travel unit is scheduled to finish travelling the second section, finding, in connection with the first vehicle, a third vehicle that is scheduled to travel the second section in the direction opposite to the direction of travel of the first vehicle and provided with the first type travel unit; and instructing the first vehicle and the third vehicle to exchange the first type travel unit and the second type travel unit.

3. The information processing apparatus according to claim 1, wherein the controller determines a place and time at which the first vehicle and the second vehicle are to meet.

4. The information processing apparatus according to claim 1, wherein the controller finds as the second vehicle a vehicle that is provided with the second type travel unit and will reach at a first end of the first section from the other end thereof at a time near the time at which the first vehicle is scheduled to arrive at the first end of the first section.

5. The information processing apparatus according to claim 1, wherein when the second vehicle is not found, the controller determines that the first vehicle is to travel the second section of the road with the first type travel unit unchanged.

6. The information processing apparatus according to claim 1, wherein the controller calculates a fee for use of the first type travel unit to be paid by a user associated with the first vehicle on a basis of a length of time of travel with the first type travel unit.

7. The information processing apparatus according to claim 1, wherein the controller determines the first type travel unit on a basis of road properties of the first section.

8. An information processing system comprising a controller equipped with at least one processor,
the controller configured to execute processing of:
finding a first vehicle whose cabin unit and travel unit are separable from each other and is scheduled to travel a first section of road in a direction of travel with a first type travel unit,
finding a second vehicle whose cabin unit and travel unit are separable from each other is scheduled to travel the first section in a direction opposite to the direction of travel of the first vehicle and finish travelling a second section with a second type travel unit, wherein the second type travel unit is selected and provided for continued travel for the first vehicle in a second section of road after the first section of road,
wherein the travel unit of the second type is selected based on at least a capability to travel the second section of road, and
instructing the first vehicle and the second vehicle to exchange the first type travel unit and the second type travel unit in order that the first vehicle continues travelling with the second type travel unit in the second section of the road.

9. The information processing system according to claim 8, wherein the controller is configured to further execute the processing of:
when the first vehicle provided with the second type travel unit is scheduled to finish travelling the second section, finding, in connection with the first vehicle, a third vehicle that is scheduled to travel the second section in the direction opposite to the direction of travel of the first vehicle and provided with the first type travel unit; and
instructing the first vehicle and the third vehicle to exchange the first type travel unit and the second type travel unit; and instructing the first vehicle and the third vehicle to exchange the first type travel unit and the second type travel unit.

10. The information processing system according to claim 8, wherein the controller determines a place and time at which the first vehicle and the second vehicle are to meet.

11. The information processing system according to claim 8, wherein the controller finds as the second vehicle a vehicle that is provided with the second type travel unit and will reach at a first end of the first section from the other end thereof at a time near the time at which the first vehicle is scheduled to arrive at the first end of the first section.

12. The information processing system according to claim 8, wherein when the second vehicle is not found, the controller determines that the first vehicle is to travel the second section of the road with the first type travel unit unchanged.

13. The information processing system according to claim 8, wherein the controller calculates a fee for use of the first type travel unit to be paid by a user associated with the first vehicle on a basis of a length of time of travel with the first type travel unit.

14. The information processing system according to claim 8, wherein the controller determines the first type travel unit on a basis of road properties of the first section.

15. The information processing method comprising:
finding a first vehicle whose cabin unit and travel unit are separable from each other and is scheduled to travel a first section of road in a direction of travel with a first type travel unit,
finding a second vehicle whose cabin unit and travel unit are separable from each other is scheduled to travel the first section in a direction opposite to the direction of travel of the first vehicle and finish travelling a second section with a second type travel unit, wherein the second type travel unit is selected and provided for continued travel for the first vehicle in a second section of road after the first section of road,
wherein the travel unit of the second type is selected based on at least a capability to travel the second section of road, and
instructing the first vehicle and the second vehicle to exchange the first type travel unit and the second type travel unit in order that the first vehicle continues travelling with the second type travel unit in the second section of the road.

16. An information processing method according to claim 15, further comprising:
when the first vehicle provided with the first type travel unit is scheduled to finish travelling the first section, finding, in connection with the first vehicle, a third vehicle that is scheduled to travel the first section in the direction opposite to the direction of travel of the first vehicle and provided with the second type travel unit; and
instructing the first vehicle and the third vehicle to exchange the first type travel unit and the second type travel unit.

17. The information processing method according to claim 15, further comprising determining a place and time at which the first vehicle and the second vehicle are to meet.

18. The information processing method according to claim 15, wherein found as the second vehicle is a vehicle that is provided with the second type travel unit and will reach at a first end of the first section from the other end thereof at a time near the time at which the first vehicle is scheduled to arrive at the first end of the first section.

19. The information processing method according to claim 15, wherein when the second vehicle is not found, the controller determines that the first vehicle is to travel the second section of the road with the first type travel unit unchanged.

20. The information processing method according to claim 15, further comprising calculating a fee for use of the first type travel unit to be paid by a user associated with the first vehicle on a basis of a length of time of travel with the first type travel unit.

* * * * *